US012764626B2

(12) United States Patent
Hu

(10) Patent No.: US 12,764,626 B2
(45) Date of Patent: Oct. 13, 2026

(54) INTRA-FREQUENCY INTRA-SYSTEM MEASUREMENT METHOD AND APPARATUS, STORAGE MEDIUM, AND ELECTRONIC DEVICE

(71) Applicant: ZTE Corporation, Shenzhen (CN)

(72) Inventor: Xiaoxin Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 359 days.

(21) Appl. No.: 18/579,003

(22) PCT Filed: Jul. 1, 2022

(86) PCT No.: PCT/CN2022/103409
§ 371 (c)(1),
(2) Date: Jan. 12, 2024

(87) PCT Pub. No.: WO2023/284569
PCT Pub. Date: Jan. 19, 2023

(65) Prior Publication Data

US 2024/0323792 A1 Sep. 26, 2024

(30) Foreign Application Priority Data

Jul. 15, 2021 (CN) ......................... 202110803242.4

(51) Int. Cl.
*H04W 36/30* (2009.01)
*H04W 36/00* (2009.01)

(52) U.S. Cl.
CPC ..... *H04W 36/302* (2023.05); *H04W 36/0058* (2018.08); *H04W 36/0069* (2018.08); *H04W 36/304* (2023.05)

(58) Field of Classification Search
CPC ........... H04W 36/302; H04W 36/0058; H04W 36/0069; H04W 36/304; H04W 36/00692;
(Continued)

(56) References Cited

U.S. PATENT DOCUMENTS

2019/0373498 A1 12/2019 Yiu et al.
2020/0396656 A1 12/2020 Yang et al.
(Continued)

FOREIGN PATENT DOCUMENTS

CN 108882264 A 11/2018
CN 109842962 A 6/2019
(Continued)

OTHER PUBLICATIONS

International Search Report for corresponding application PCT/CN2022/103409 filed Jul. 1, 2022; Mail date Aug. 30, 2022.
(Continued)

*Primary Examiner* — Yu-Wen Chang
(74) *Attorney, Agent, or Firm* — CANTOR COLBURN LLP

(57) ABSTRACT

Embodiments of the present disclosure provide an intra-frequency intra-system measurement method and apparatus, a storage medium, and an electronic device. The method includes: detecting, by a system, that a neighbor cell in a neighbor area is inter-frequency or inter-Ratio Access Technology (RAT) with a current Master Node (MN) cell or a current Secondary Node (SN) cell in a source area; and transmitting, by the current SN cell or the current MN cell that is intra-frequency and intra-RAT with the neighbor cell, a measurement instruction for intra-frequency intra-system measurement to a terminal. The measurement instruction is used for instructing the terminal to perform intra-frequency intra-system measurement on the neighbor cell.

18 Claims, 3 Drawing Sheets

(58) Field of Classification Search
CPC ....... H04W 36/0061; H04W 36/00698; H04W 36/0088; H04W 24/08
See application file for complete search history.

(56) References Cited

U.S. PATENT DOCUMENTS

| | | | | |
|---|---|---|---|---|
| 2022/0141842 | A1* | 5/2022 | Kanamarlapudi | H04W 72/23 370/329 |
| 2022/0286881 | A1* | 9/2022 | Orsino | H04W 24/08 |
| 2022/0312245 | A1* | 9/2022 | Cui | H04W 24/10 |
| 2024/0056931 | A1* | 2/2024 | Lin | H04W 36/305 |

FOREIGN PATENT DOCUMENTS

| | | | |
|---|---|---|---|
| CN | 111385941 | A | 7/2020 |
| CN | 111417131 | A | 7/2020 |
| JP | 2017506466 | A | 3/2017 |
| JP | 2020526090 | A | 8/2020 |
| JP | 2021100272 | A | 7/2021 |
| WO | 2020027615 | A1 | 2/2020 |
| WO | 2021068226 | A1 | 4/2021 |

OTHER PUBLICATIONS

European Search Report for corresponding application EP22841207.8; Report dated Oct. 24, 2024.
Japanese Office Action; Application No. 2024501819; date of mailing: Sep. 17, 2025; 4 pages.

* cited by examiner

INTRA-FREQUENCY INTRA-SYSTEM MEASUREMENT METHOD AND APPARATUS, STORAGE MEDIUM, AND ELECTRONIC DEVICE

CROSS-REFERENCE TO RELATED APPLICATION

The disclosure is a National Stage Filing of the PCT International Application No. PCT/CN2022/103409 filed on Jul. 1, 2022, which is based upon and claims priority to Chinese Patent Application No. CN202110803242.4 filed to the China National Intellectual Property Administration on Jul. 15, 2021 and entitled "Intra-Frequency Intra-System Measurement Method and Apparatus, Storage Medium, and Electronic Device", the disclosure of which is hereby incorporated by reference in its entirety.

TECHNICAL FIELD

Embodiments of the present disclosure relate to the field of communications, and in particular, to an intra-frequency intra-system measurement method and apparatus, a storage medium, and an electronic device.

BACKGROUND

At present, when a terminal is under a Dual Connection (DC), if a current Master Node (MN) cell is inter-frequency/inter-Radio Access Technology (RAT) with a neighbor cell that cannot be used as a Secondary Node (SN), but a current SN cell is intra-frequency and intra-RAT with the neighbor cell that cannot be used as the SN, a normal handover process is as follows. A terminal accesses the network to establish a DC; the current MN cell notifies the terminal to perform B-series measurement (the B-series measurement in the 3rd Generation Partnership Project (3GPP) protocol is used for inter-RAT or inter-frequency); the current MN cell notifies the terminal of GAP information required for measurement (the terminal completes inter-frequency or inter-system measurement through GAP); the terminal monitors a designated neighbor cell, and sends a measurement report to the current MN cell when a neighbor cell signal satisfies a B-series measurement condition; and the current MN cell decides to initiate handover of the DC to this neighbor cell to notify the terminal to perform handover to the corresponding cell.

If a current SN cell is inter-frequency/inter-RAT with a neighbor cell that can be used as an SN, but a current MN cell is intra-frequency and intra-RAT with the neighbor cell that can be used as the SN, a normal handover process is as follows. A terminal accesses the network to establish a DC; the current SN cell notifies the terminal to perform B-series measurement (the B-series measurement in the 3GPP protocol is used for inter-RAT or inter-frequency); the current SN cell notifies the terminal of GAP information required for measurement (the terminal completes inter-frequency or inter-system measurement through GAP); the terminal monitors a designated neighbor cell, and sends a measurement report to the current SN cell when a neighbor cell signal satisfies a B-series measurement condition; and the current SN cell decides to hand over the SN to this neighbor cell to notify the terminal to perform handover to the corresponding cell.

The above solution can complete handover normally, but has the following disadvantages.

The terminal needs to start GAP to complete the inter-system/inter-frequency measurement, but the starting of GAP will affect the performance of the terminal, for example, by about 10%.

A system usually first performs intra-frequency measurement, and performs inter-frequency/inter-system measurement later, which may cause interference to neighbor cells. This is very evident at a junction of Non StandAlone (NSA) and StandAlone (SA).

For problems in the related art that a terminal needs to start GAP to complete inter-system/inter-frequency measurement, but the starting of GAP will affect the performance of the terminal, moreover, since intra-frequency intra-RAT is first performed, and inter-frequency/inter-system measurement is performed later, the terminal cannot be handed over to an inter-frequency/inter-system cell in time to cause the interference to neighbor cells, a solution has not been proposed yet.

SUMMARY

Embodiments of the present disclosure provide an inter-frequency inter-system measurement method and apparatus, a storage medium, and an electronic device, which may solve the problems in the related art that a terminal needs to start GAP to complete inter-system/inter-frequency measurement, but the starting of GAP will affect the performance of the terminal, moreover, since intra-frequency intra-RAT is first performed, and inter-frequency/inter-system measurement is performed later, the terminal cannot be handed over to an inter-frequency/inter-system cell in time to cause the interference to neighbor cells.

According to an embodiment of the present disclosure, an inter-frequency inter-system measurement method is provided, which is applied to a system, and includes the following operations.

It is detected that a neighbor cell in a neighbor area and a current MN cell or a current SN cell in a source area are inter-frequency or inter-RAT.

A measurement instruction for intra-frequency intra-system measurement is transmitted to a terminal through the current SN cell or the current MN cell that is intra-frequency and intra-RAT with the neighbor cell. The measurement instruction is used for instructing the terminal to perform intra-frequency intra-system measurement on the neighbor cell.

According to another embodiment of the present disclosure, an intra-frequency intra-system measurement method is further provided, which includes the following operations.

A current MN cell and a current SN cell detect that a neighbor cell in a neighbor area and the current MN cell or the current SN cell are inter-frequency or inter-RAT.

A measurement instruction for intra-frequency intra-system measurement is transmitted to a terminal through the current SN cell or the current MN cell that is intra-frequency and intra-RAT with the neighbor cell. The measurement instruction is used for instructing the terminal to perform intra-frequency intra-system measurement on the neighbor cell.

According to another embodiment of the present disclosure, an intra-frequency intra-system measurement apparatus is further provided, which is deployed in a system, and includes a first detection module and a first transmission module.

The first detection module is configured to detect that a neighbor cell in a neighbor area and a current MN cell or a current SN cell in a source area are inter-frequency or inter-RAT.

The first transmission module is configured to transmit a measurement instruction for intra-frequency intra-system measurement to a terminal through the current SN cell or the current MN cell that is intra-frequency and intra-RAT with the neighbor cell. The measurement instruction is used for instructing the terminal to perform intra-frequency intra-system measurement on the neighbor cell.

According to another embodiment of the present disclosure, an intra-frequency inter-system measurement apparatus is further provided, which includes a current MN cell and a current SN cell.

The current MN cell and the current SN cell are configured to detect that a neighbor cell in a neighbor area and the current MN cell or the current SN cell are inter-frequency or inter-RAT.

The current SN cell or the current MN cell that is intra-frequency and intra-RAT with the neighbor cell is configured to transmit a measurement instruction for intra-frequency intra-system measurement to a terminal. The measurement instruction is used for instructing the terminal to perform intra-frequency intra-system measurement on the neighbor area.

According to still another embodiment of the present disclosure, a computer-readable storage medium is further provided. The storage medium stores a computer program. The computer program, when running on a processor, causes the processor to perform the operations in any one of the above method embodiments.

According to still another embodiment of the present disclosure, an electronic device is further provided. The electronic device includes a memory and a processor. The memory stores a computer program, and the processor is configured to run the computer program to perform the operations in any one of the method embodiments.

In the embodiments of the present disclosure, it is detected that the neighbor cell in the neighbor area is inter-frequency or inter-RAT with the current MN cell or the current SN cell in the source area; the measurement instruction for intra-frequency intra-system measurement is transmitted to the terminal through the current SN cell or the current MN cell that is intra-frequency and intra-RAT with the neighbor cell. The measurement instruction is used for instructing the terminal to perform intra-frequency intra-system measurement on the neighbor cell. The solution may solve the problems in the related art that a terminal needs to start GAP to complete inter-system/inter-frequency measurement, but the starting of GAP will affect the performance of the terminal, moreover, since intra-frequency intra-RAT is first performed, and inter-frequency/inter-system measurement is performed later, the terminal cannot be handed over to an inter-frequency/inter-system cell in time to cause the interference to neighbor cells. The system intensively performs intra-frequency intra-RAT measurement on the neighbor area, the GAP does not need to be started, the performance loss caused by the GAP is reduced, and the interference to a neighbor intra-frequency intra-RAT cell is avoided as much as possible.

DETAILED DESCRIPTION

Figure 1:
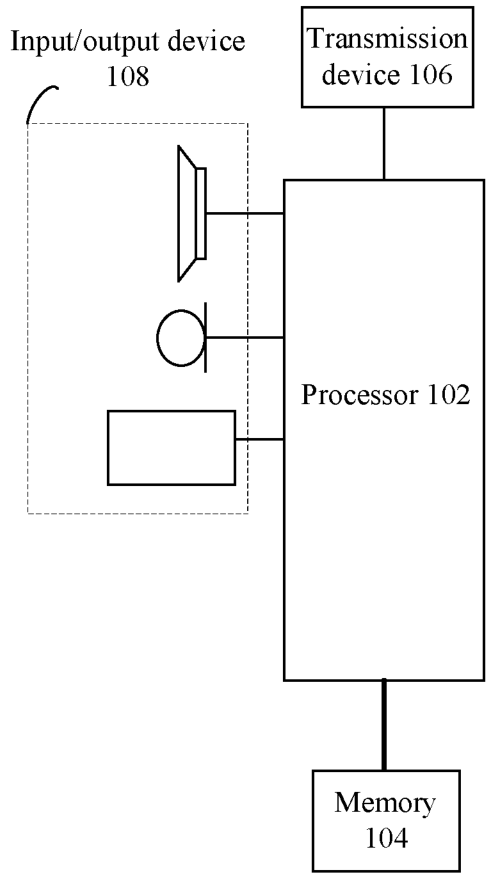
FIG. 1 is a block diagram of the hardware structure of a mobile terminal for implementing an intra-frequency intra-system measurement method according to an embodiment of the present disclosure.

The embodiments of the present disclosure are described in detail below with reference to the drawings and in conjunction with the embodiments.

It is to be noted that the specification and claims of the present disclosure and the terms “first”, “second” and the like in the drawings are used to distinguish similar objects, and do not need to describe a specific sequence or a precedence order.

The method embodiment provided in the embodiments of the present disclosure may be performed in a mobile terminal, a computer terminal or a similar computing apparatus. Taking running on the mobile terminal as an example, FIG. 1 is a block diagram of the hardware structure of a mobile terminal for implementing an intra-frequency intra-system measurement method according to an embodiment of the present disclosure. As shown in FIG. 1, the mobile terminal may include one or more (only one shown in FIG. 1) processors 102 (the one or more processors 102 may include, but are not limited to, processing apparatuses such as a Microprocessor Control Unit (MCU) or a Field Programmable Gate Array (FPGA)) and a memory 104 for storing data. The above mobile terminal may also include a transmission device 106 for a communication function and an input/output device 108. Those having ordinary skill in the art may understand that the structure shown in FIG. 1 is only illustrative and does not limit the structure of the above mobile terminal. For example, the mobile terminal may also include more or fewer components than those shown in FIG. 1, or has a different configuration from that shown in FIG. 1.

The memory 104 may be configured to store a computer program, for example, a software program of application software and modules, such as a computer program corresponding to an intra-frequency intra-system measurement method in the embodiments of the present disclosure. The one or more processors 102 executes various functional applications and service chain address pool slicing processing, that is, implements the above method by running the computer program stored in the memory 104. The memory 104 may include a high speed random access memory or a non-volatile memory such as one or more magnetic storage apparatuses, flash memories, or other non-volatile solid state memories. In some embodiments, the memory 104 may further include memories remotely located relative to the one or more processors 102. These remote memories may be connected to the mobile terminal through a network. The examples of the network include, but are not limited to, the Internet, the Intranet, a local area network, a mobile communication network, and combinations thereof.

The transmission device 106 is configured to receive or transmit data through a network. Specific instances of the network may include a wireless network provided by a communication provider of the mobile terminal. In one instance, the transmission device 106 includes a Network Interface Controller (NIC) that can be connected to other network devices through a base station to communicate with the Internet. In one instance, the transmission device 106 may be a Radio Frequency (RF) module, which is configured to communicate with the Internet in a wireless manner.

Figure 2:
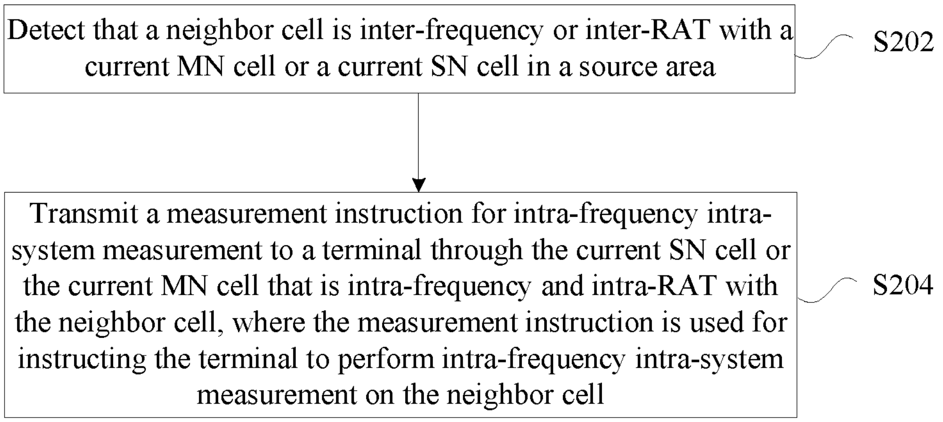
FIG. 2 is a flowchart 1 of an intra-frequency intra-system measurement method according to an embodiment of the present disclosure.

This embodiment provides an intra-frequency intra-system measurement method running on the above mobile terminals or network architecture. The intra-frequency intra-system measurement method is performed by a terminal. The terminal is connected to a current MN cell and a current SN cell of a source area through DC. FIG. 2 is a flowchart 1 of an intra-frequency intra-system measurement method according to an embodiment of the present disclosure. As shown in FIG. 2, when applied to a system, the process includes the following operations.

At operation S202, it is detected that a neighbor cell in a neighbor area is inter-frequency/inter-RAT with the current MN cell or the current SN cell in the source area.

At operation S204, a measurement instruction for intra-frequency intra-system measurement is transmitted to a terminal through the current SN cell or the current MN cell that is intra-frequency and intra-RAT with the neighbor cell. The measurement instruction is used for instructing the terminal to perform intra-frequency intra-system measurement on the neighbor cell.

In some exemplary implementations of the embodiment, the above operation S204 may include that: in a case that the neighbor area does not support an SN cell, when an MN cell of the neighbor area is inter-frequency or inter-RAT with the current MN cell and is intra-frequency and intra-RAT with the current SN cell, the measurement instruction is transmitted to the terminal through the current SN cell; and in a case that the neighbor area supports the SN cell, when an SN cell of the neighbor area is inter-frequency or inter-RAT with the current SN cell and is intra-frequency and intra-RAT with the current MN cell, the measurement instruction is transmitted to the terminal through the current MN cell.

In this embodiment, the source area is a SA area, an NSA area, Multi-RAT Dual Connectivity (MR-DC), or a DC. The MR-DC at least includes: Option 3, Option 4, or Option 7.

Through the above operations S202 to S204, the problems in the related art that a terminal needs to start GAP to complete inter-system/inter-frequency measurement, but the starting of GAP will affect the performance of the terminal, moreover, since intra-frequency intra-RAT is first performed, and inter-frequency/inter-system measurement is performed later, the terminal cannot be handed over to an inter-frequency/inter-system cell in time to cause the interference to neighbor cells can be solved. The system intensively performs intra-frequency intra-RAT measurement on the neighbor area, the GAP does not need to be started, the performance loss caused by the GAP is reduced, and the interference to a neighbor intra-frequency intra-RAT cell is avoided as much as possible.

In an embodiment, after the above operation S204, in a case that signal quality of the neighbor cell satisfies a preset measurement condition, the measurement report transmitted by the terminal is transmitted to the current MN cell through the current SN cell. The measurement report includes a 1*s* signal quality measurement result and neighbor cell information of the neighbor cell. In some exemplary implementations, it is detected that the current SN cell has received the measurement report; the current SN cell is controlled to transmit the measurement report to the current MN cell through an SN initiated SN change process; it is determined that the neighbor cell does not support the SN cell according to the neighbor cell information; and a first handover instruction is transmitted to the terminal through the current MN cell, where the first handover instruction is used for instructing the terminal to be handed over from the current MN cell to the MN cell of the neighbor area.

In another embodiment, after the above operation S204, in a case that signal quality of the neighbor cell satisfies a preset measurement condition, the measurement report transmitted by the terminal is received through the current MN cell. The measurement report includes a signal quality measurement result and neighbor cell information of the neighbor cell. It is determined that the neighbor cell supports the SN cell according to the neighbor cell information. The MN cell is controlled to perform an MN initiated SN change process. The MN initiated SN change process is used for notifying the current SN cell that the terminal is handed over from the current SN cell to the SN cell of the neighbor area. A second handover instruction is transmitted to the terminal through the current MN cell. The second handover instruction is used for instructing the terminal to be handed over from the current SN cell to the SN cell of the neighbor area.

Figure 3:
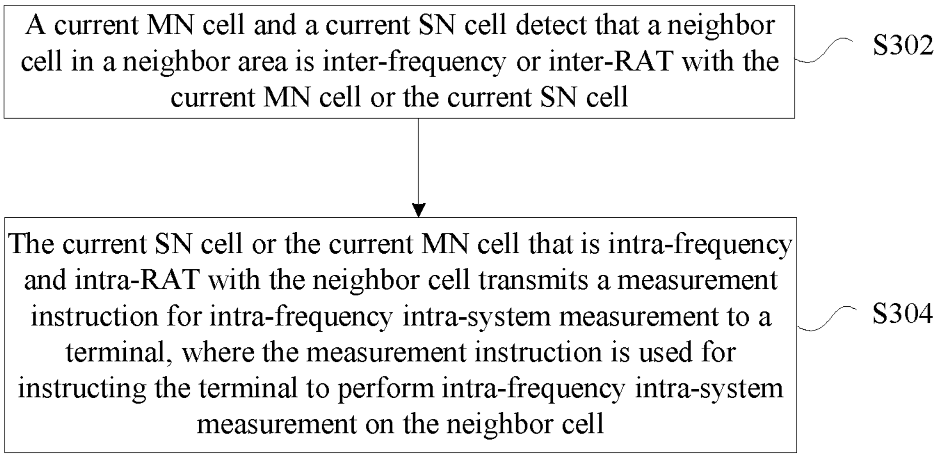
FIG. 3 is a flowchart 2 of an intra-frequency intra-system measurement method according to an embodiment of the present disclosure.

According to another embodiment of the present disclosure, an intra-frequency intra-system measurement method is further provided. FIG. 3 is a flowchart 2 of an intra-frequency intra-system measurement method according to an embodiment of the present disclosure. As shown in FIG. 3, the flow includes the following operations.

At operation S302, a current MN cell is inter-frequency or inter-RAT with a current SN cell detect that a neighbor cell in a neighbor area and the current MN cell or the current SN cell.

At operation S304, the current SN cell or the current MN cell that is intra-frequency and intra-RAT with the neighbor cell transmits a measurement instruction for intra-frequency intra-system measurement to a terminal. The measurement instruction is used for instructing the terminal to perform intra-frequency intra-system measurement on the neighbor cell.

In this embodiment, the source area of the current MN cell and the current SN cell is a SA area, an NSA area, MR-DC, or a DC. In some exemplary implementations, the MR-DC at least includes: Option 3, Option 4, or Option 7.

In some exemplary implementations of this embodiment, the above operation S304 may include the following operations.

At S3041, in a case that the neighbor area does not support an SN cell, when an MN cell of the neighbor area is inter-frequency or inter-RAT with the current MN cell and is intra-frequency and intra-RAT with the current SN cell, the measurement instruction is transmitted to the terminal through the current SN cell.

At S3042, in a case that the neighbor area supports the SN cell, when an SN cell of the neighbor area is inter-frequency or inter-RAT with the current SN cell and is intra-frequency and intra-RAT with the current MN cell, the measurement instruction is transmitted to the terminal through the current MN cell.

Through the above operations S302 to S304, the problems in the related art that a terminal needs to start GAP to complete inter-system/inter-frequency measurement, but the starting of GAP will affect the performance of the terminal, moreover, since intra-frequency intra-RAT is first performed, and inter-frequency/inter-system measurement is performed later, the terminal cannot be handed over to an inter-frequency/inter-system cell in time to cause the interference to neighbor cells can be solved. Intra-frequency intra-RAT measurement is performed on the neighbor area through the current MN cell and the current SN cell in a distributed manner, the GAP does not need to be started, the performance loss caused by the GAP is reduced, and the interference to a neighbor intra-frequency intra-RAT cell is avoided as much as possible.

In an embodiment, after the above operation S3041, in a case that signal quality of the neighbor cell satisfies a preset measurement condition, the measurement report transmitted by the terminal is received by the current SN cell. The measurement report includes a signal quality measurement result and neighbor cell information of the neighbor cell. The current SN cell determines that the neighbor cell does not support the SN cell according to the neighbor cell information. The current SN cell transmits the measurement report to the current MN cell. The current MN cell determines that the neighbor cell does not support the SN cell according to the neighbor cell information, and transmits a first handover instruction to the terminal. The first handover instruction is used for instructing the terminal to be handed over from the current MN cell to the MN cell of the neighbor area. In some exemplary implementations, the operation that the current SN cell transmits, to the current MN cell, the measurement report transmitted by the terminal may include that: the current SN cell transmits the measurement report to the current MN cell through an SN initiated SN change process.

In another embodiment, after the above operation S3042, in a case that signal quality of the is neighbor cell satisfies a preset measurement condition, the measurement report transmitted by the terminal is received through the current MN cell. The measurement report includes a signal quality measurement result and neighbor cell information of the neighbor cell. The current MN cell determines that the neighbor cell supports the SN cell according to the neighbor cell information. The current MN cell performs an MN initiated SN change process. The MN initiated SN change process is used for notifying the current SN cell that the terminal is handed over from the current SN cell to the SN cell of the neighbor area. A second handover instruction is transmitted to the terminal through the current MN cell. The second handover instruction is used for instructing the terminal to be handed over from the current SN cell to the SN cell of the neighbor area.

According to another embodiment of the present disclosure, an intra-frequency intra-system measurement method is further provided. The process includes the following operations.

At operation S1, a measurement instruction for intra-frequency intra-system measurement transmitted by a system through the current MN cell or the current SN cell that is intra-frequency and intra-RAT with the neighbor area is received. The measurement instruction is triggered after the system detects that the current MN cells or the current SN cells of the neighbor area is inter-frequency or inter-RAT with the source area.

In this embodiment, the above operation S1 may specifically include that: in a case that the neighbor area does not support an SN cell, the measurement instruction transmitted by the system through the current SN cell is received. The measurement instruction is triggered after the system detects that the neighbor area is inter-frequency or inter-RAT with the current MN cell, and is intra-frequency and intra-RAT with the current SN cell; and in a case that the neighbor area supports the SN cell, the measurement instruction transmitted by the system through the current MN cell is received. The measurement instruction is triggered after the system detects that the SN cell of the neighbor area is inter-frequency or inter-RAT with the current SN cell, and is intra-frequency and intra-RAT with the current MN cell.

At operation S2, intra-frequency intra-system measurement is performed on the neighbor area according to the measurement instruction.

The current MN cell and the current SN cell detect that the neighbor area is inter-frequency or inter-RAT with the current MN cell, and the current SN cell transmits a measurement instruction to the terminal. The current SN cell is intra-frequency or intra-RAT with the neighbor cell; or the current MN cell and the current SN cell detect that the neighbor cell is inter-frequency or inter-RAT with the current SN cell, the current MN cell transmits the measurement instruction to the terminal. The current MN cell and the neighbor cell are intra-frequency and intra-RAT.

In this embodiment, the source area is a SA area, an NSA area, MR-DC, or a DC. The MR-DC at least includes: Option 3, Option 4, or Option 7.

Through the above operations, the problems in the related art that a terminal needs to start GAP to complete inter-system/inter-frequency measurement, but the starting of GAP will affect the performance of the terminal, moreover, since intra-frequency intra-RAT is first performed, and inter-frequency/inter-system measurement is performed later, the terminal cannot be handed over to an inter-frequency/inter-system cell in time to cause the interference to neighbor cells can be solved. Intra-frequency intra-RAT measurement is performed on the neighbor cell, the GAP does not need to be started, the performance loss caused by the GAP is reduced, and the interference to a neighbor intra-frequency intra-RAT cell is avoided as much as possible.

In an embodiment, after the above operation S2, in a case that the signal quality of a target neighbor cell in a neighbor area satisfies a preset measurement condition, the measurement report is transmitted to the system and the current MN cell through the current SN cell. The measurement report includes a signal quality measurement result and neighbor cell information of the target neighbor cell. In some exemplary implementations, in a case where the system is set at a base station corresponding to the current MN cell, the measurement report is reported to the current SN cell. The measurement report is transmitted to the system and the current MN cell through an SN initiated SN change process. A handover instruction transmitted by the system according to the measurement report is received. The handover instruction carries the signal quality measurement result and the target neighbor cell information of the target neighbor cell. Handover is performed from the current MN cell to the MN cell of the target neighbor cell according to the handover instruction.

In another embodiment, after the above operation S2, in a case that the signal quality of the target neighbor cell in a neighbor area satisfies a preset measurement condition, the measurement report is transmitted to the system through the current MN cell. The measurement report includes a signal quality measurement result and neighbor cell information of the target neighbor cell. In some exemplary implementations, in a case where the system is set at a base station corresponding to the current MN cell, the measurement report is transmitted to the system through a current MN initiated SN change process. A handover instruction transmitted by the system according to the measurement report is received. The handover instruction carries the signal quality measurement result and the target neighbor cell information of the target neighbor cell. Handover is performed from the current SN cell to the SN cell of the target neighbor cell according to the handover instruction.

Through the solution of performing inter-system/inter-frequency measurement without starting GAP of this embodiment, the performance loss caused by the GAP is reduced, and the interference to an intra-frequency inter-RAT cell is avoided as much as possible.

The terminal is connected to the network, and the DC connection is established. In a case that the system identifies that a neighbor cell that cannot be used as the SN is inter-frequency/inter-RAT with the current MN cell, but is intra-frequency and intra-RAT with the current SN cell, the following operations may be performed.

The current SN cell notifies a User Equipment (UE) to perform series-A (such as A3 or A5) measurement, and the current SN cell does not notify the current MN cell that the measurement has been performed (otherwise, the current MN cell will notify the UE to start the GAP).

The UE measures the neighbor cell according to series-A (such as A3 or A5), and does not start the GAP. In a case that a neighbor cell signal satisfies a measurement condition, the UE sends the measurement report to notify the current SN cell.

After the current SN cell receives the measurement report, and finds that this neighbor cell cannot be used as the SN, in such a case, a general operation is to discard the report information. However, in the present solution, the current SN cell does not discard the report, but triggers an SN initiated SN change process to notify the current MN cell, and in this process, the current SN cell will transmit a measurement result of a target SA cell to the current MN cell.

According to the measurement result and the target cell information, the current MN cell understands that this cell is a neighbor cell that cannot be used as the SN, and makes a decision to trigger the handover from the current MN cell to this cell.

In a case that the system identifies that a neighbor SN cell is inter-frequency/inter-RAT with the current SN cell, but is intra-frequency and intra-RAT with the current MN cell, the following operations may be performed.

The current MN cell notifies the UE to perform series-A (such as A3 or A5) measurement, and the current SN cell does not perform an action.

The UE measures an intra-frequency New Ratio (NR) neighbor cell according to series-A (such as A3 or A5), and does not start the GAP. In a case that a neighbor cell signal satisfies a measurement condition, the UE sends a measurement report to notify the current MN cell of occurrence time and corresponding neighbor cell information.

The current MN cell initiates an MN initiated SN change process to hand over the SN from the current SN cell to the target neighbor cell.

Figure 4:
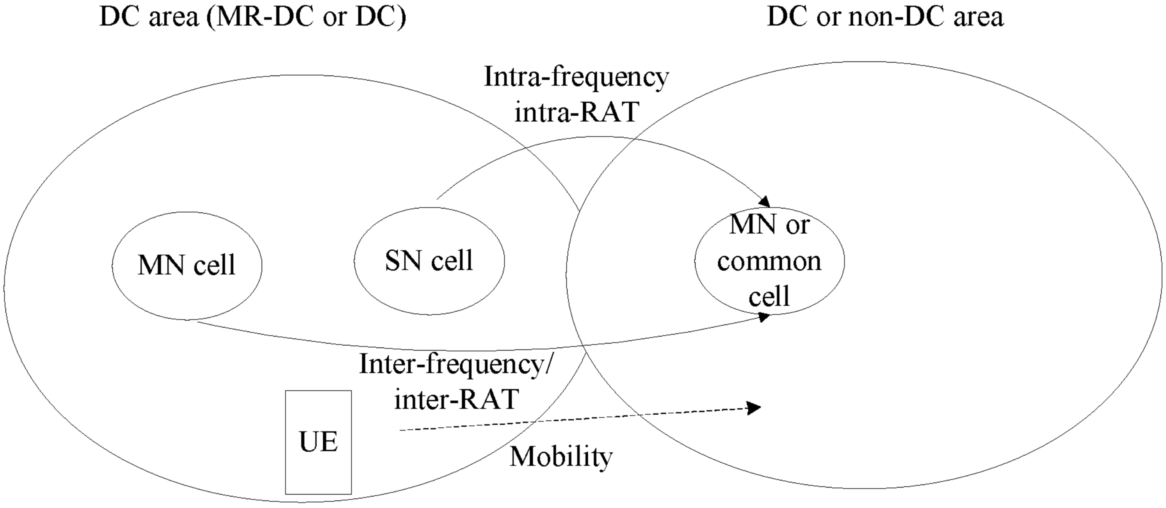
FIG. 4 is a schematic diagram 1 of performing intra-frequency intra-system measurement without starting GAP according to an embodiment of the present disclosure.

FIG. 4 is a schematic diagram 1 of performing intra-frequency intra-system measurement without starting GAP according to this embodiment. As shown in FIG. 4, the flow includes the following operations.

At operation 1, a terminal establishes DC in a source area.

At operation 2, a system determines that a neighbor cell cannot be used as an SN, and the neighbor cell is inter-frequency/inter-RAT with the current MN cell, but is intra-frequency and intra-RAT with the current SN cell.

At operation 3, the current SN cell notifies the UE to perform A3 measurement.

At operation 4, the current SN cell does not notify the current MN cell that the measurement has been performed.

At operation 5, the UE measures the neighbor cell according to A3, and does not start GAP.

At operation 6, the UE continues moving from the source area to a target area.

At operation 7, when neighbor cell signal quality satisfies a measurement condition, the UE sends to the current SN cell a measurement report including a signal quality measurement result and corresponding neighbor cell information.

At operation 8, after receiving the measurement report, the current SN cell identifies that this neighbor cell cannot be used as the SN, and triggers an SN initiated SN change process to notify the current MN cell, and the current SN cell transmits the measurement result of the target neighbor cell to the current MN cell.

At Operation 9, according to the measurement result and the target cell information, the current MN cell understands that this cell cannot be used as the SN, and makes a decision to trigger the handover from the current MN cell to the target neighbor cell.

Figure 5:
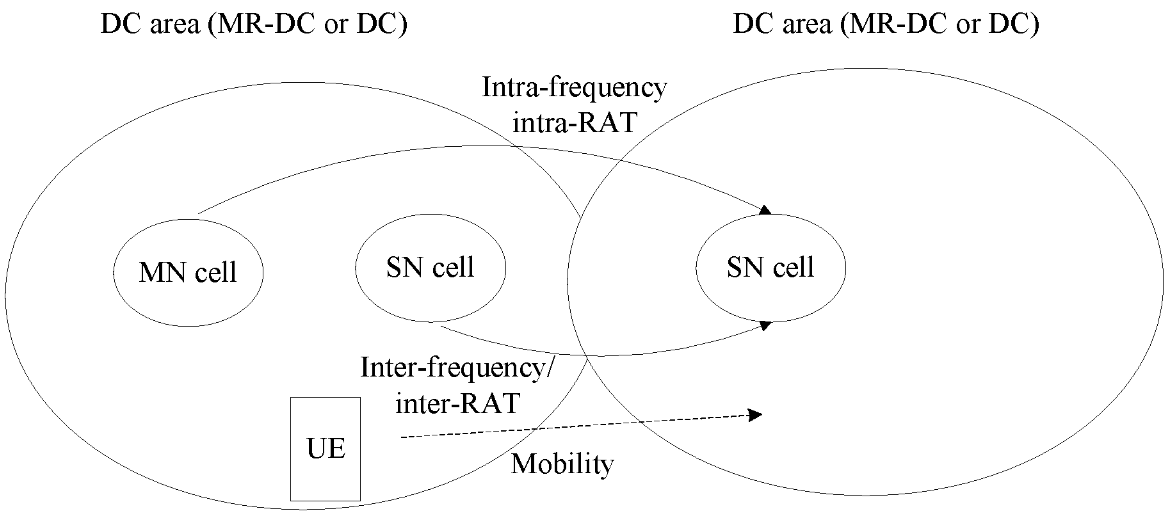
FIG. 5 is a schematic diagram 2 of performing intra-frequency intra-system measurement without starting GAP according to an embodiment of the present disclosure.

FIG. 5 is a schematic diagram 2 of performing intra-frequency intra-system measurement without starting GAP according to this embodiment. As shown in FIG. 5, the flow includes the following operations.

At operation 1, a terminal establishes DC in a source area.

At operation 2, a system identifies that a neighbor SN cell is inter-frequency/inter-RAT with the current SN cell, but is intra-frequency and intra-RAT with the current MN cell.

At operation 3, the current MN cell notifies the UE to perform A3 measurement, and the current SN cell does not perform an action.

At operation 4, the UE measures an intra-frequency NR neighbor cell according to A3, and does not start the GAP.

At operation 5, the UE continues moving from the source area to a target area.

At operation 6, when neighbor cell signal quality satisfies a measurement condition, the UE sends a measurement report to the current MN cell to notify the current MN cell of occurrence time, a signal quality measurement result, and corresponding neighbor cell information.

At operation 7, the current MN cell triggers an MN initiated SN change process to hand over the SN from the current SN cell to the target neighbor cell.

Figure 6:
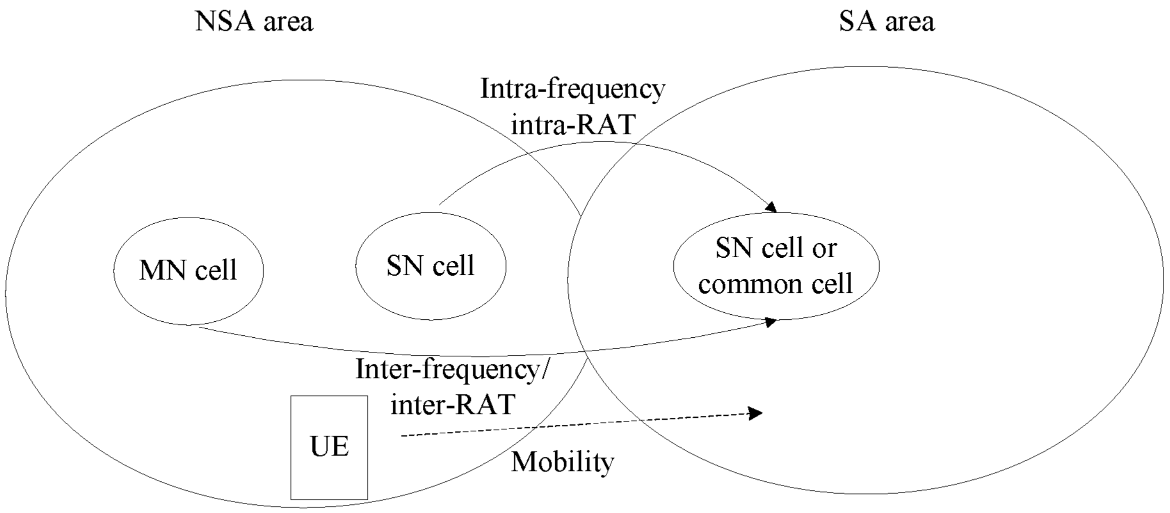
FIG. 6 is a schematic diagram 3 of performing intra-frequency intra-system measurement without starting GAP according to an embodiment of the present disclosure.

FIG. 6 is a schematic diagram 3 of performing intra-frequency intra-system measurement without starting GAP according to this embodiment. As shown in FIG. 6, the flow includes the following operations.

At operation 1, the overall wireless network includes an NSA area and a SA area of Option 2 type.

At operation 2, the UE accesses the NSA network and initiates a service under the NSA network, and establishes an EN-DC link.

At operation 3, the system determines that the SN where the UE is located is intra-frequency and intra-RAT with an NR neighbor cell of a neighbor 5th-Generation (5G) base station.

At operation 4, the current SN cell notifies the UE to perform A3 measurement.

At operation 5, the current SN cell does not notify the current MN cell that the measurement has been performed.

At operation 6, the UE measures an intra-frequency NR neighbor cell according to A3, and does not start the GAP.

At operation 7, the UE continues moving from the NSA area to the SA area.

At operation 8, when the NR neighbor cell signal quality of the SA area satisfies a measurement condition, the UE sends a measurement report to the current SN cell to notify the current SN cell of occurrence time, a signal quality measurement result, and corresponding NR neighbor cell information.

At operation 9, after receiving the measurement report, the current SN cell identifies that this NR neighbor cell cannot be used as the SN, and triggers an SN initiated SN change process to notify the current MN cell, and the current SN cell transmits the measurement result of the target NR to the current MN cell.

At operation 10, according to the measurement result and the target NR cell information, the current MN cell understands that this NR neighbor cell is a SA neighbor cell and cannot be used as the SN, and makes a decision to trigger handover from the NSA to the SA, so as to perform handover to the target NR neighbor cell.

In this embodiment, inter-system/inter-frequency measurement can be started without starting the GAP, so as to avoid the performance loss caused by the GAP. Measurement is started in time, so as to perform handover in time and reduce the interference to the neighbor cell. The 3GPP standard process is not changed, and special processing does not need to be performed by the UE, therefore the applicability is good, and the application range is wide.

Figure 7:
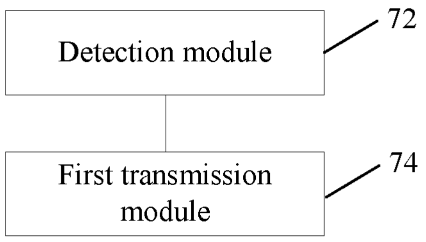
FIG. 7 is a block diagram of an intra-frequency intra-system measurement apparatus according to an embodiment of the present disclosure.

According to another embodiment of the present disclosure, an intra-frequency intra-system measurement apparatus is further provided. FIG. 7 is a block diagram of an intra-frequency intra-system measurement apparatus according to this embodiment. As shown in FIG. 7, the apparatus is deployed in a system, and including a first detection module 72 and a first transmission module 74.

The first detection module 72 is configured to detect that a neighbor cell in a neighbor area is inter-frequency or inter-RAT with a current MN cell or a current SN cell in a source area.

The first transmission module 74 is configured to transmit a measurement instruction for intra-frequency intra-system measurement to a terminal through the current SN cell or the current MN cell that is intra-frequency and intra-RAT with the neighbor cell. The measurement instruction is used for instructing the terminal to perform intra-frequency intra-system measurement on the neighbor cell.

In an exemplary embodiment, the first transmission module 74 includes a first transmitting submodule and a second transmitting submodule.

The first transmitting submodule is configured to: in a case that the neighbor area does not support an SN cell, when an MN cell of the neighbor area is inter-frequency or inter-RAT with the current MN cell and is intra-frequency and intra-RAT with the current SN cell, transmit the measurement instruction to the terminal through the current SN cell.

the second transmitting submodule is configured to: in a case that the neighbor area supports the SN cell, when an SN cell of the neighbor area is inter-frequency or inter-RAT with the current SN cell and is intra-frequency and intra-RAT with the current MN cell, transmit the measurement instruction to the terminal through the current MN cell.

In an exemplary embodiment, the apparatus further include a second transmitting submodule, a determination submodule, and a third transmitting submodule.

The second transmitting submodule is configured to: in a case that signal quality of the neighbor cell satisfies a preset measurement condition, transmit, to the current MN cell through the current SN cell, a measurement report transmitted by the terminal. The measurement report includes a signal quality measurement result and neighbor cell information of the neighbor cell.

The determination submodule is configured to determine that the neighbor cell does not support the SN cell according to the neighbor cell information.

The third transmitting submodule is configured to transmit a first handover instruction to the terminal through the current MN cell. The first handover instruction is used for instructing the terminal to be handed over from the current MN cell to the MN cell of the neighbor area.

In an exemplary embodiment, the second transmitting submodule is further configured to:

detect that the current SN cell has received the measurement report; and control the current SN cell to transmit the measurement report to the current MN cell through an SN initiated SN change process.

In an exemplary embodiment, the apparatus further include a fourth transmitting submodule, a second determination submodule, a control submodule, and a fifth transmitting submodule.

The fourth transmitting submodule is configured to: in a case that signal quality of the neighbor cell satisfies a preset measurement condition, receive the measurement report transmitted by the terminal through the current MN cell. The measurement report includes a signal quality measurement result and target neighbor cell information of a target neighbor cell.

The second determination submodule is configured to determine that the neighbor cell supports the SN cell according to the neighbor cell information.

The control submodule is configured to control the current MN cell to perform an MN initiated SN change process. The MN initiated SN change process is used for notifying the current SN cell that the terminal is handed over from the current SN cell to the SN cell of the neighbor area.

The fifth transmitting submodule is configured to transmit a second handover instruction to the is terminal through the current MN cell. The second handover instruction is used for instructing the terminal to be handed over from the current SN cell to the SN cell of the neighbor area.

In an exemplary embodiment, the source area is a SA area, a NSA area, MR-DC, or a DC.

In an exemplary embodiment, the MR-DC least includes: Option 3, Option 4, or Option 7.

According to another embodiment of the present disclosure, an intra-frequency intra-system measurement apparatus is further provided, which includes: a current MN cell and a current SN cell.

The current MN cell and the current SN cell are configured to detect that a neighbor cell in a neighbor area is inter-frequency or inter-RAT with the current MN cell or the current SN cell.

The current SN cell or the current MN cell that is intra-frequency and intra-RAT with the neighbor cell transmits a measurement instruction for intra-frequency intra-system measurement to a terminal. The measurement instruction is used for instructing the terminal to perform intra-frequency intra-system measurement on the neighbor cell.

In an exemplary embodiment, in a case that the neighbor area does not support an SN cell, when an MN cell of the neighbor area is inter-frequency or inter-RAT with the current MN cell and is intra-frequency and intra-RAT with the current SN cell, the measurement instruction is transmitted to the terminal through the current SN cell.

In a case that the neighbor area supports the SN cell, when an SN cell of the neighbor area is inter-frequency or inter-RAT with the current SN cell and is intra-frequency and intra-RAT with the current MN cell, the current MN cell is configured to transmit the measurement instruction to the terminal.

In an exemplary embodiment, in a case that signal quality of the neighbor cell satisfies a preset measurement condition, the current SN cell is configured to receive the measurement report transmitted by the terminal. The measurement report includes a signal quality measurement result and neighbor cell information of the neighbor cell.

The current SN cell is configured to determine that the neighbor cell does not support the SN cell according to the neighbor cell information, and transmit the measurement report to the current MN cell.

The current MN cell is configured to determine that the neighbor cell does not support the SN cell according to the neighbor cell information, and transmit a first handover instruction to the is terminal. The first handover instruction is used for instructing the terminal to be handed over from the current MN cell to the MN cell of the neighbor area.

In an exemplary embodiment, the current SN cell is configured to transmit the measurement report to the current MN cell through an SN initiated SN change process.

In an exemplary embodiment, in a case that signal quality of the neighbor cell satisfies a preset measurement condition, the MN cell is configured to receive the measurement report transmitted by the terminal. The measurement report includes a signal quality measurement result and neighbor cell information of a target neighbor cell.

The current MN cell is configured to determine that the neighbor cell supports the SN cell according to the neighbor cell information, and perform an MN initiated SN change process. The MN initiated SN change process is used for notifying the current SN cell that the terminal is handed over from the current SN cell to the SN cell of the neighbor area.

The current MN cell is configured to transmit a second handover instruction to the terminal. The second handover instruction is used for instructing the terminal to be handed over from the current SN cell to the SN cell of the neighbor area.

The embodiments of the present disclosure further provide a computer-readable storage medium. The computer-readable storage medium stores a computer program. The computer program, when running on a processor, causes the processor to perform the operations in any one of the abovementioned embodiments.

In one exemplary embodiment, the above computer-readable storage medium may include, but is not limited to, various media capable of storing a computer program, such as a USB flash disk, a Read-Only Memory (ROM), a Random Access Memory (RAM), a mobile hard disk, a magnetic disk, or a compact disk.

The embodiments of the present disclosure further provide an electronic device, including a memory and a processor. The memory stores a computer program. The processor is configured to run the computer program to perform the operations in any one of the method embodiments.

In one exemplary embodiment, the electronic device may further include a transmission device and an input/output device. The transmission device is connected to the processor. The input/output device is connected to the processor.

A specific example in the present embodiment may refer to the examples described in the above embodiments and exemplary implementations, which will not be elaborated herein in the present embodiment.

It is apparent that those skilled in the art shall understand that the various modules or various operations in the present disclosure may be implemented by using a general computing apparatus. They may be centralized on a single computing apparatus or may be distributed on a network composed of a plurality of computing apparatuses. They may be implemented by using executable program codes of the computing apparatuses. Thus, they may be stored in a storage apparatus and executed by the computing apparatuses, the shown or described operations may be executed in a sequence different from this sequence under certain conditions, or they are manufactured into various integrated circuit modules respectively, or a plurality of modules or operations therein are manufactured into a single integrated circuit module. Therefore, the present disclosure is not limited to any specific hardware and software combination.

The foregoing descriptions are merely preferred embodiments of the present disclosure, but are not intended to limit the present disclosure. Persons skilled in the art understand that the present disclosure may have various modifications and variations. Any modification, equivalent replacement, improvement or the like made within the principle of the present disclosure shall fall within the protection scope of the present disclosure.

What is claimed is:

1. An intra-frequency intra-system measurement method, applied to a system, the method comprising:

detecting that a neighbor cell in a neighbor area is inter-frequency or inter-Radio Access Technology (RAT) with a current Master Node (MN) cell or a current Secondary Node (SN) cell in a source area; and transmitting a measurement instruction for intra-frequency intra-system measurement to a terminal through the current SN cell or the current MN cell that is intra-frequency and intra-RAT with the neighbor cell, wherein the measurement instruction is used for instructing the terminal to perform intra-frequency intra-system measurement on the neighbor cell, wherein transmitting the measurement instruction for intra-frequency intra-system measurement to the terminal through the current SN cell or the current MN cell that is intra-frequency and intra-RAT with the neighbor cell comprises: in a case that the neighbor area does not support an SN cell, when an MN cell of the neighbor area is inter-frequency or inter-RAT with the current MN cell and is intra-frequency and intra-RAT with the current SN cell, transmitting the measurement instruction to the terminal through the current SN cell; and in a case that the neighbor area supports the SN cell, when an SN cell of the neighbor area is inter-frequency or inter-RAT with the current SN cell and is intra-frequency and intra-RAT with the current MN cell, transmitting the measurement instruction to the terminal through the current MN cell.

2. The method according to claim 1, wherein after transmitting the measurement instruction to the terminal through the current SN cell, the method further comprises:

in a case that signal quality of the neighbor cell satisfies a preset measurement condition, transmitting, to the current MN cell through the current SN cell, a measurement report transmitted by the terminal, wherein the measurement report comprises a signal quality measurement result and neighbor cell information of the neighbor cell;

determining that the neighbor cell does not support the SN cell according to the neighbor cell information; and transmitting a first handover instruction to the terminal through the current MN cell, wherein the first handover instruction is used for instructing the terminal to be handed over from the current MN cell to the MN cell of the neighbor area.

3. The method according to claim 2, wherein transmitting, to the current MN cell through the current SN cell, the measurement report transmitted by the terminal comprises:

detecting that the current SN cell has received the measurement report; and controlling the current SN cell to transmit the measurement report to the current MN cell through an SN initiated SN change process.

4. The method according to claim 1, wherein after transmitting the measurement instruction to the terminal through the current MN cell, the method further comprises:

in a case that signal quality of the neighbor cell satisfies a preset measurement condition, receiving, by the current MN cell, the measurement report transmitted by the terminal, wherein the measurement report comprises a signal quality measurement result and target neighbor cell information of a target neighbor cell;

determining that the neighbor cell supports the SN cell according to the neighbor cell information;

controlling the current MN cell to perform an MN initiated SN change process, wherein the MN initiated SN change process is used for notifying the current SN cell that the terminal is handed over from the current SN cell to the SN cell of the neighbor area; and transmitting a second handover instruction to the terminal through the current MN cell, wherein the second handover instruction is used for instructing the terminal to be handed over from the current SN cell to the SN cell of the neighbor area.

5. The method according to claim 1, wherein the source area is a StandAlone (SA) area, a Non StandAlone (NSA) area, a Multi-RAT Dual Connectivity (MR-DC), or Dual Connectivity (DC).

6. The method according to claim 5, wherein the MR-DC at least comprises: Option 3, Option 4, or Option 7.

7. A non-transitory computer-readable storage medium, storing a computer program, wherein the computer program, when running on a processor, causes the processor to perform the method according to claim 1.

8. An electronic device, comprising a memory and a processor, wherein the memory stores a computer program, and the processor is configured to run the computer program to perform the method according to claim 1.

9. The method according to claim 1, wherein in a case of transmitting the measurement instruction to the terminal through the current SN cell, the current SN cell does not notify the current MN cell that the measurement has been performed.

10. The method according to claim 1, wherein the measurement instruction is used for instructing the terminal to perform intra-frequency intra-system measurement on the neighbor cell without starting GAP.

11. An intra-frequency intra-system measurement method, comprising:

detecting, by a current Master Node (MN) cell and a current Secondary Node (SN) cell, that a neighbor cell in a neighbor area is inter-frequency or inter-Radio Access Technology (RAT) with the current MN cell or the current SN cell; and transmitting a measurement instruction for intra-frequency intra-system measurement to a terminal through the current SN cell or the current MN cell that is intra-frequency and intra-RAT with the neighbor cell, wherein the measurement instruction is used for instructing the terminal to perform intra-frequency intra-system measurement on the neighbor cell, wherein transmitting the measurement instruction for intra-frequency intra-system measurement to the terminal through the current SN cell or the current MN cell that is intra-frequency and intra-RAT with the neighbor cell comprises: in a case that the neighbor area does not support an SN cell, when an MN cell of the neighbor area is inter-frequency or inter-RAT with the current MN cell and is intra-frequency and intra-RAT with the current SN cell, transmitting the measurement instruction to the terminal through the current SN cell; and in a case that the neighbor area supports the SN cell, when an SN cell of the neighbor area is inter-frequency or inter-RAT with the current SN cell and is intra-frequency and intra-RAT with the current MN cell, transmitting the measurement instruction to the terminal through the current MN cell.

12. The method according to claim 11, wherein after transmitting the measurement instruction to the terminal through the current SN cell, the method further comprises:

in a case that signal quality of the neighbor cell satisfies a preset measurement condition, receiving, by the current SN cell, a measurement report transmitted by the terminal, wherein the measurement report comprises a signal quality measurement result and neighbor cell information of the neighbor cell;

determining, by the current SN cell, that the neighbor cell does not support the SN cell according to the neighbor cell information;

transmitting, to the current MN cell by the current SN cell, the measurement report transmitted by the terminal; and determining, by the current MN cell, that the neighbor cell does not support the SN cell according to the neighbor cell information, and transmitting a first handover instruction to the terminal, wherein the first handover instruction is used for instructing the terminal to be handed over from the current MN cell to the MN cell of the neighbor area.

13. The method according to claim 12, wherein transmitting, to the current MN cell by the current SN cell, the measurement report transmitted by the terminal comprises:

transmitting, by the current SN cell, the measurement report to the current MN cell through an SN initiated SN change process.

14. The method according to claim 11, wherein after transmitting the measurement instruction to the terminal through the current MN cell, the method further comprises:

in a case that signal quality of the neighbor cell satisfies a preset measurement condition, receiving, by the current MN cell, the measurement report transmitted by the terminal, wherein the measurement report comprises a signal quality measurement result and neighbor cell information of a target neighbor cell;

determining, by the current MN cell, that the neighbor cell supports the SN cell according to the neighbor cell information;

performing, by the current MN cell, an MN initiated SN change process, wherein the MN initiated SN change process is used for notifying the current SN cell that the terminal is handed over from the current SN cell to the SN cell of the neighbor area; and transmitting a second handover instruction to the terminal through the current MN cell, wherein the second handover instruction is used for instructing the terminal to be handed over from the current SN cell to the SN cell of the neighbor area.

15. The method according to claim 11, wherein in a case of transmitting the measurement instruction to the terminal through the current SN cell, the current SN cell does not notify the current MN cell that the measurement has been performed.

16. The method according to claim 11, wherein the measurement instruction is used for instructing the terminal to perform intra-frequency intra-system measurement on the neighbor cell without starting GAP.

17. A non-transitory computer-readable storage medium, storing a computer program, wherein the computer program, when running on a processor, causes the processor to perform the method according to claim 11.

18. An electronic device, comprising a memory and a processor, wherein the memory stores a computer program, and the processor is configured to run the computer program to perform the method according to claim 11.

* * * * *